US012558578B2

(12) United States Patent
Staton

(10) Patent No.: US 12,558,578 B2
(45) Date of Patent: Feb. 24, 2026

(54) DEMOLISHING OF GLAZING AT A DISTANCE

(71) Applicant: Larry David Staton, Allen Park, MI (US)

(72) Inventor: Larry David Staton, Allen Park, MI (US)

( * ) Notice: Subject to any disclaimer, the term of this patent is extended or adjusted under 35 U.S.C. 154(b) by 377 days.

(21) Appl. No.: 17/803,401

(22) Filed: Jun. 23, 2022

(65) Prior Publication Data

US 2022/0331616 A1 Oct. 20, 2022

Related U.S. Application Data

(62) Division of application No. 16/974,276, filed on Dec. 14, 2020, now Pat. No. 12,409,348.

(51) Int. Cl.
*B25B 33/00* (2006.01)
*A47L 13/254* (2006.01)
*A62B 3/00* (2006.01)

(52) U.S. Cl.
CPC ............ *A62B 3/005* (2013.01); *A47L 13/254* (2013.01); *B25B 33/00* (2013.01); *B25D 2250/271* (2013.01)

(58) Field of Classification Search
CPC . B65F 1/1405; E01C 19/32; B25D 2250/271; A47L 13/254; A62B 3/00; B25B 33/00; A01B 1/00; A01B 1/227
USPC ................ 7/114; 172/21; 404/133.1, 133.05; 15/159
See application file for complete search history.

(56) References Cited

U.S. PATENT DOCUMENTS

| | | | |
|---|---|---|---|
| 302,832 | A | 7/1884 | Ferguson |
| 348,268 | A | 8/1886 | Coursen |
| 641,925 | A | 1/1900 | Blundell |
| 832,036 | A | 10/1906 | Bunker |
| 1,107,976 | A | 8/1914 | McCoy |
| 1,371,988 | A | 3/1921 | Toof et al. |
| 1,482,452 | A | 2/1924 | Williams |
| 1,515,437 | A | 11/1924 | Heald |

(Continued)

FOREIGN PATENT DOCUMENTS

DE 202012010886 U1 * 1/2013 ........... B30B 9/3042

OTHER PUBLICATIONS

Youtube—https://www.youtube.com/watch?v=SL9Om5pek1A Publicaiton date Sep. 9, 2017 Author—Johnny DIY (Year: 2017).*

(Continued)

*Primary Examiner* — Tom Rodgers
(74) *Attorney, Agent, or Firm* — Andrew C. Pike

(57) ABSTRACT

Demolishing glazing at a distance uses a demolition ram comprising a pusher, a handle having proximal and distal ends, and fasteners connecting the handle at the distal end to the pusher. The demolishing comprises touching a subpane of the glazing with the pusher, pushing the subpane out of the glazing, and moving the subpane so that it can fall due to its weight, and then catching the falling subpane with a receptacle comprising a mat. The pushing comprises exerting a force about the proximal end, and generating an impulsive force onto the subpane by the exerting through the touching. The impulsive force is generally coaxial with the force of the exerting. The handle has a slenderness ratio of at least twenty-five and not more than one hundred ten that distances the exerting from the generating.

10 Claims, 5 Drawing Sheets

(56) References Cited

U.S. PATENT DOCUMENTS

| | | | |
|---|---|---|---|
| 1,587,254 | A | 6/1926 | Taseff |
| 1,605,008 | A | 11/1926 | Smith |
| 1,662,170 | A | 3/1928 | Sahlstrom |
| 1,674,964 | A | 6/1928 | Ewing et al. |
| 1,750,845 | A | 3/1930 | Lach |
| 1,792,589 | A | 2/1931 | Johnson |
| 1,821,875 | A | 9/1931 | Bochnek |
| 1,922,998 | A | 8/1933 | Williams |
| 1,930,000 | A | 10/1933 | Bulger |
| 2,234,831 | A | 3/1941 | Porter |
| 2,306,944 | A | 12/1942 | Gray |
| 2,312,086 | A | 2/1943 | Feldman |
| 2,639,454 | A | 5/1953 | Dory |
| 2,699,614 | A | 1/1955 | Welch |
| 2,708,764 | A | 5/1955 | Scott |
| 2,717,406 | A | 9/1955 | Herman et al. |
| 2,731,658 | A | 1/1956 | Miller |
| 2,834,625 | A | 5/1958 | Stanley et al. |
| 2,888,701 | A | 6/1959 | Twerdahl |
| 2,958,143 | A | 11/1960 | Bonic |
| 3,069,713 | A | 12/1962 | Obraske |
| 3,153,252 | A | 10/1964 | Ricciardi |
| 3,295,155 | A | 1/1967 | Belsky et al. |
| 3,338,607 | A | 8/1967 | Broadhurst, Jr. |
| 3,388,415 | A | 6/1968 | Warner et al. |
| 3,465,377 | A | 9/1969 | Thomas |
| 3,540,071 | A | 11/1970 | Jorgensen |
| 3,604,028 | A | 9/1971 | Wardwell |
| 3,773,375 | A | 11/1973 | Nehls |
| 3,996,639 | A | 12/1976 | Griffin et al. |
| 4,070,128 | A | 1/1978 | Garrison |
| 4,127,911 | A | 12/1978 | Cupp et al. |
| 4,214,346 | A | 7/1980 | McDonald |
| 4,245,411 | A | 1/1981 | McMath |
| 4,253,214 | A | 3/1981 | Bushee |
| 4,317,250 | A | 3/1982 | Shutts |
| 4,329,755 | A | 5/1982 | Alissandratos |
| 4,375,299 | A | 3/1983 | Laven |
| 4,467,490 | A | 8/1984 | Adams |
| 4,516,799 | A | 5/1985 | O'Donnell |
| 4,550,943 | A | 11/1985 | Mirto |
| 4,607,872 | A | 8/1986 | Herner |
| 4,783,105 | A | 11/1988 | Schulz |
| 4,848,819 | A | 7/1989 | Moorefield |
| 4,852,210 | A | 8/1989 | Krajicek |
| 4,888,942 | A | 12/1989 | Monaco |
| 4,947,562 | A | 8/1990 | Williamson |
| 4,970,750 | A | 11/1990 | Davis, III |
| 5,056,245 | A | 10/1991 | Jenkins et al. |
| 5,067,197 | A | 11/1991 | Cormier |
| 5,105,493 | A | 4/1992 | Lugtenaar |
| 5,309,654 | A | 5/1994 | Mathis |
| 5,346,269 | A | 9/1994 | Price |
| D355,286 | S | 2/1995 | Wallace et al. |
| 5,410,771 | A | 5/1995 | Bereza |
| 5,419,015 | A | 5/1995 | Garcia |
| 5,419,600 | A | 5/1995 | Tisbo et al. |
| 5,435,610 | A | 7/1995 | Roberts |
| 5,437,450 | A | 8/1995 | Akatsuka et al. |
| 5,461,749 | A | 10/1995 | Ahlberg et al. |
| 5,467,496 | A | 11/1995 | Jarvis |
| D368,561 | S | 4/1996 | Hodges et al. |
| 5,524,369 | A | 6/1996 | Phillips |
| 5,525,189 | A | 6/1996 | Villers |
| D372,406 | S | 8/1996 | Scarvaglione |
| 5,568,668 | A | 10/1996 | Margolin |
| 5,606,761 | A | 3/1997 | Lynch |
| 5,609,255 | A * | 3/1997 | Nichols .................. A47L 13/20 15/228 |
| 5,707,588 | A | 1/1998 | Tsukishima |
| 5,806,608 | A | 9/1998 | DuBois |
| 5,810,333 | A | 9/1998 | Hickerson et al. |
| 5,885,145 | A | 3/1999 | O'Mara |
| 5,983,455 | A | 11/1999 | Polzin et al. |
| 6,003,915 | A | 12/1999 | Bierman |
| D422,427 | S | 4/2000 | Packer |
| 6,052,982 | A | 4/2000 | Haar |
| 6,397,427 | B1 | 6/2002 | Bryngelsson |
| 6,481,040 | B1 | 11/2002 | McIntyre |
| 6,526,619 | B1 | 3/2003 | Cassels, Jr. |
| 6,543,951 | B1 | 4/2003 | Bauman |
| 6,558,073 | B1 | 5/2003 | Wrazidlo |
| 6,709,189 | B1 | 3/2004 | Spooner |
| 6,769,153 | B1 | 8/2004 | Post et al. |
| 6,944,980 | B1 | 9/2005 | Lefrancois |
| 6,990,705 | B1 | 1/2006 | Schouten et al. |
| 7,134,244 | B2 | 11/2006 | Diamond |
| 7,156,435 | B1 | 1/2007 | Mourelatos et al. |
| D539,496 | S | 3/2007 | Sickler et al. |
| 7,740,416 | B2 | 6/2010 | Lesche |
| 7,887,092 | B1 | 2/2011 | Pacheco et al. |
| D636,236 | S | 4/2011 | Telford, Jr. |
| D637,404 | S | 5/2011 | Wang |
| 8,096,368 | B1 | 1/2012 | Rider |
| 8,166,597 | B2 | 5/2012 | Levitt et al. |
| 8,277,144 | B1 | 10/2012 | Bayley |
| 8,464,387 | B1 | 6/2013 | Cohen |
| 8,522,649 | B2 | 9/2013 | Yousufzai |
| D694,484 | S | 11/2013 | Angel et al. |
| 8,701,238 | B1 | 4/2014 | Morad et al. |
| 8,756,741 | B2 | 6/2014 | Cohen |
| D716,122 | S | 10/2014 | Bingham |
| D724,910 | S | 3/2015 | Davis |
| 8,973,201 | B1 | 3/2015 | De Vito et al. |
| 9,032,584 | B1 | 5/2015 | McAvoy |
| 9,765,534 | B1 | 9/2017 | DiLuzio et al. |
| D824,128 | S | 7/2018 | O'Shea |
| 10,052,009 | B1 | 8/2018 | Morad |
| D866,896 | S | 11/2019 | Gee, II et al. |
| 10,744,635 | B1 | 8/2020 | Stratton |
| 10,794,060 | B1 | 10/2020 | Ramsey |
| 10,927,511 | B2 | 2/2021 | Dellario |
| 11,066,831 | B2 | 7/2021 | Ramsey |
| 2002/0155220 | A1 | 10/2002 | Ray et al. |
| 2003/0009839 | A1 | 1/2003 | Streutker et al. |
| 2003/0136029 | A1 | 7/2003 | Nieckula et al. |
| 2003/0204926 | A1 | 11/2003 | Jurgens et al. |
| 2004/0108121 | A1 | 6/2004 | Lowther |
| 2004/0244117 | A1 | 12/2004 | Huang |
| 2005/0017223 | A1 | 1/2005 | Lucas |
| 2005/0025580 | A1 | 2/2005 | Wheeler et al. |
| 2005/0144816 | A1 | 7/2005 | Payton |
| 2005/0152737 | A1 | 7/2005 | Tien et al. |
| 2005/0155171 | A1 | 7/2005 | Boyer et al. |
| 2005/0229438 | A1 | 10/2005 | Douziech |
| 2005/0278887 | A1 | 12/2005 | Kraft, III |
| 2005/0279520 | A1 | 12/2005 | Newman et al. |
| 2006/0097530 | A1 | 5/2006 | Marquardt et al. |
| 2006/0288537 | A1 | 12/2006 | Francisco et al. |
| 2007/0089255 | A1 | 4/2007 | Michelson et al. |
| 2007/0226935 | A1 | 10/2007 | Lu |
| 2008/0030036 | A1 | 2/2008 | Shuler |
| 2008/0066253 | A1 | 3/2008 | Stevens |
| 2009/0214295 | A1* | 8/2009 | Lesche .................. E01C 19/32 404/133.05 |
| 2010/0205758 | A1 | 8/2010 | Levitt et al. |
| 2011/0013982 | A1 | 1/2011 | Prohaska |
| 2011/0020051 | A1 | 1/2011 | Robertson et al. |
| 2011/0094047 | A1 | 4/2011 | Gold et al. |
| 2011/0126490 | A1 | 6/2011 | De Leon |
| 2011/0209298 | A1 | 9/2011 | Weaver |
| 2011/0219962 | A1 | 9/2011 | Ivkovic |
| 2011/0258889 | A1 | 10/2011 | Settembre et al. |
| 2012/0023696 | A1 | 2/2012 | Huang |
| 2012/0167320 | A1 | 7/2012 | Weaver |
| 2013/0000064 | A1 | 1/2013 | Katou et al. |
| 2014/0007906 | A1 | 1/2014 | Bates et al. |
| 2014/0137338 | A1 | 5/2014 | Meinzer et al. |
| 2014/0215739 | A1 | 8/2014 | Lindner et al. |
| 2014/0338141 | A1 | 11/2014 | Morancey |
| 2015/0074927 | A1 | 3/2015 | Widmer et al. |
| 2015/0089757 | A1 | 4/2015 | Davidshofer et al. |
| 2015/0314143 | A1 | 11/2015 | McCann |
| 2015/0315756 | A1 | 11/2015 | Glosser |

(56) References Cited

U.S. PATENT DOCUMENTS

| | | | |
|---|---|---|---|
| 2016/0144833 | A1 | 5/2016 | Cohen |
| 2016/0157595 | A1 | 6/2016 | Rajaiah et al. |
| 2016/0356009 | A1 | 12/2016 | Pieper-Bailey et al. |
| 2017/0057066 | A1 | 3/2017 | Senegal |
| 2017/0113340 | A1 | 4/2017 | Tomasovich |
| 2017/0143179 | A1 | 5/2017 | Taylor et al. |
| 2017/0225317 | A1 | 8/2017 | Cook |
| 2017/0240143 | A1 | 8/2017 | Vaeth |
| 2017/0260705 | A1 | 9/2017 | Katauskas |
| 2018/0141202 | A1 | 5/2018 | Newman et al. |
| 2019/0193257 | A1 | 6/2019 | Monahan et al. |
| 2019/0200834 | A1 | 7/2019 | Olschan et al. |
| 2019/0390422 | A1 | 12/2019 | Tavolino |
| 2019/0390852 | A1 | 12/2019 | Sigurdson |
| 2020/0029776 | A1 | 1/2020 | Shintani |
| 2020/0113402 | A1 | 4/2020 | Shintani et al. |
| 2021/0290028 | A1 | 9/2021 | Martinez et al. |

OTHER PUBLICATIONS

Translation of DE202012010886U1 (Year: 2012).*

Homedepot: (https://www.homedepot.com/p/ZipWall-ZP4-Contains-4-10-ft-Steel-Spring-Loaded-Poles-4-Heads-4-Plates-4-Tethers-4-Grip-Disks..-182643/202564462#overlay) (Year: 2011).

Homedepot: (https://www.homedepot.com/p/Asphalt-8-in-x-8-in-Welded-Steel-Head-And-Handle-Tamper-19-152/305979356) (Year: 2019).

Build Master tools: (https://buildmastertools.com/product/dirt-tamper-plate-11-34%E2%80%B3-x-8-14%E2%80%B3-fit-jack-hammer-1-18%E2%80%B3-hitachi-mak/) (Year:2017).

YouTube: DIY ground tamper tool fast easy cheap; view video at (https://www.youtube.com/watch?v=loVfgneDhu8) [online] (Year: 2020).

YouTube: DIY/Homemade dirt, sand, and gravel tamper update; view video at (https://www.youtube.com/watch?v=ak6rLLetmL4) [online] (Year: 2018).

Marshalltown (https://marshalltown.com/pro-2302-shock-absorbing-coated-tamper) (Year: 2019).

The Fabricator (https://thefabricator.com/thefabricator/article/cadcamsoftware/the-art-of-bevel-cutting) (Year: 2014).

Dictionary.com definition for rigidly (Year: 2022).

W.W. Manufacturing Co., Inc. catalog, W.W. Manufacturing Company, Inc., Bridgeton, New Jersey, 6 sheets, 10 pages; dated Oct. 2021.

Accu-Tamper® / Wire Entrenching Tool / Landscape Lighting Install Tool brochure, W.W. Manufacturing Company, Inc., Bridgeton, New Jersey, 1 sheet, 2 pages; no date.

STF Spades & Shovels / Pitch, Stone/Mulch Forks / Mower Deck Grass Scrapers brochure, W.W. Manufacturing Company, Inc., Bridgeton, New Jersey, 1 sheet, 2 pages; no date.

YouTube: Accu Tamper 2015; view video at (https://www.youtube.com/watch?v=6plulWcrsjs) [online] (Year: 2015).

* cited by examiner

DEMOLISHING OF GLAZING AT A DISTANCE

CROSS-REFERENCE TO RELATED APPLICATIONS

This application is a divisional of application Ser. No. 16/974,276 filed Dec. 14, 2020, which is incorporated by reference.

BACKGROUND OF THE INVENTION

Field of the Invention

The present invention relates to demolishing glazing, and particularly to window or panel assemblies and structures and especially large-scale glazing such as plate glass, and to safely remove the panes or subpanes from the glazing.

Background Art

The glazing industry encompasses both the installation of glazing and the demolition of glazing, both the pane or panes of the window or the panel and also the assemblies and structures thereof such as the framing. At times, undamaged glazing may be demolished to be replaced, by either new glazing or by having the opening for it in the wall for it to be closed up or sealed off.

More often, however, one or more of the panes of the glazing have been cracked, or broken or shattered into subpanes, necessitating replacement of the panes. Before replacement, the panes and subpanes must be removed from the glazing.

Typically, the material of the panes of the glazing is one or another composition of glass, although other substances are also used. The broken edge of glass is well known to be exceptionally sharp, rivaling even deliberately designed knives, razors, and scalpels. The movement of a broken glass edge can quickly slice through ordinary cloth, and especially slice through living tissue such as skin, oftentimes painlessly without being immediately noticed. When moving under force, such as gravity when falling, broken glass edge can also slice through muscle and bone, and has been known to inflict serious and even fatal injuries, for example, to internal organs.

While the glazing of windows that are of a common size for residential use presents less of a problem in removal, but by no means hazard-free even in a general sense, greater risk is involved in the removal of large-scale glazing. Large-scale glazing frequently makes use of one large single pane; but also can use multiple large panes adjacent to each other edge-to-edge, typically horizontally aligned with each other. Such a large single pane can weigh tens of pounds to hundreds of pounds (thus effectively amount by mass to tens to hundreds of kilograms), presenting a serious risk for injury upon removal. There are many different names for such large-scale glazing, and may be exemplarily referred to as plate glass, store front, or glass walls, and may be installed as an exterior glazing separating the inside from the outside or as an interior glazing subdividing in some manner an interior volume. Common installations of large-scale glazing are in office buildings, retail shops, manufacturing factories, and even in transportation such as vehicles; but can be also used in residential buildings, where they may be referred to as a picture window.

One technique for the removal of a window or panel pane or panes, or subpane or subpanes, of either undamaged or damaged glazing, and sometimes after any supporting trim, mould, seal, or caulk is removed and typically on one side only of the pane or subpane, is to merely pick up the pane or subpane out of the glazing. However, this is fraught with great and unknowable danger. In addition to the exceptionally sharp edges of the pane or subpane when broken, commonly there may be also partial cracks or microfractures within the glazing material of the pane or subpane itself; and not every such crack or microfracture can be apparent or even seen by visual inspection without specific crack/fracture detection tools. When moved, either by direct manual manipulation or by machine, the internal stresses can quickly overwhelm the structural integrity of the glazing material at such a partial crack or microfracture. The partial crack or microfracture then rapidly extends, often so quickly as to be without any warning, and the pane or subpane virtually instantly breaks or shatters. This breaking or shattering results in more subpanes with many more exceptionally sharp edges all at once. The subpanes usually fall downward, either straight down or at an angle, with any splinters exploding outwardly. Control of the handling of the original pane or subpane being removed is usually lost, and the newly broken subpanes can unexpectedly hit people, or hit hard surfaces and break or shatter into many more pieces that also have exceptionally sharp edges. This typically occurs in about one second or less. Even if the pane or subpane that was so picked up out of the glazing does not break internally in this manner, control of the handling of that pane or subpane can still be lost suddenly, resulting in either the movement of any such exceptionally sharp edge or else the falling and hitting against of that pane or subpane onto a hard surface and the subsequent breaking or shattering of that pane or subpane, or both. Ultimately, the seemingly acceptable risk, before the removal of that pane or subpane, of this technique can quickly lead to any of these subpanes, or the original pane or subpane being removed, to cut, stab, or outright kill any nearby person, especially the worker removing the pane or subpane but even a bystander.

Another technique for the removal of a pane or panes, or a subpane or subpanes, of either undamaged or damaged glazing is to simply hammer, or otherwise push, out it or them out of the glazing. However, this makes the risk of injury even greater because those working to remove that pane or subpane are adjacent, or otherwise in close proximity, to the glazing. Any moving exceptionally sharp edge of that pane or subpane or any subpane resulting in its breaking, again, can quickly lead to that worker, or any other nearby person, being injured or killed.

A safer technique is to break up piece-by-piece the pane or subpane of the glazing in location within the glazing. Two individuals, one on each side of the glazing, work from the top of the pane or subpane to be removed downward, breaking it up into generally handheld pieces. Typically, they mount ladders to reach one uppermost corner or portion of the pane or subpane to be removed. Then one of them scores the surface of that pane or subpane to define a small section that is typically no more than about half a foot (about 15 centimeters) in its largest dimension, but does not break that pane or subpane. The other one of them, on the opposite side, works the small section loose, for example with breaking pliers, against the score line, breaking the small section from the rest of that pane or subpane. The small section is then safely removed from the glazing. This procedure is repeated, piece by piece and top to bottom, until the remainder of that pane or subpane is considered to be small enough to safely remove from the glazing in one remaining piece. The risk of breaking or shattering unexpectedly and dangerously is thus greatly reduced. But this "whittling-down" process is highly time consuming and laborious. Furthermore, the remainder of that pane or subpane can still unexpectedly and suddenly move or fall out of the glazing, and any other subpane, that is on the other side of the crack or fracture of the original glazing, can also unexpectedly and suddenly move or fall out of the glazing; and again, with persons being so close to the glazing to be demolished, serious or fatal injuries can occur.

SUMMARY OF THE INVENTION

An objective of the present invention is to reduce the risk of serious or fatal injury during the removal of a pane or subpane of glazing when the glazing is demolished.

Another objective is to more quickly demolish glazing while at the same time reducing the risk of serious or fatal injury during that demolition of the glazing.

Another objective is to distance those who are demolishing glazing from that glazing in order to reduce the risk of serious or fatal injury during that demolition of the glazing.

Another objective is to quickly assemble and disassemble a demolition ram to be used in demolishing glazing.

Another objective is to selectively modify a demolition ram to be used in demolishing glazing.

These and further objectives are met by the present invention, which is contemplated to encompass the subject matter as claimed herein, that has been described and also shown in the accompanying drawings, and the equivalents that are consonant therewith.

The present invention comprises a demolition ram. The demolition ram comprises a pusher, a handle connected to the pusher, and identical fasteners that connect the handle to the pusher. The handle has a slenderness ratio of at least twenty-five and not more than one hundred ten. The pusher comprises a plate having a proximal surface, a distal surface, and a perimeter. The pusher further comprises a boss on the proximal surface, and a plating on the distal surface. The handle has a proximal end, a distal end, and a longitudinal axis extending between the ends, and comprises a plate at the distal end. The longitudinal axis is generally perpendicular to the proximal surface, and the handle is centrally located on the proximal surface. The fasteners removably and rigidly connect the plate of the handle to the boss, and comprise identical fixed fasteners on the boss and identical removable fasteners removably mountable on the fixed fasteners. The demolition ram further comprises an end cap removably mountable on the proximal end. A handle extension is connectable to the proximal end, after removal of the end cap when the end cap is mounted on the proximal end.

One method of demolishing glazing at a distance of the present invention comprises touching a subpane of the glazing with the pusher of the demolition ram, pushing the subpane out of the glazing with the demolition ram, and moving the subpane to a position where the subpane can fall due to its weight. The touching comprises touching the subpane with the plating. The pushing comprises exerting a force about the proximal end of the handle, and generating an impulsive force onto the subpane by the exerting through the touching. The impulsive force is generally coaxial with the force of the exerting. The slenderness ratio of the handle distances the exerting from the generating. The method further comprises allowing the subpane to fall due to its weight, and catching the subpane as it falls with a receptacle comprising a mat. Assembling the pusher and the handle together comprising removably and rigidly connecting the handle to the pusher with the fasteners also distances the exerting from the generating. When the handle extension is to be connected to the proximal end of the handle, removing the end cap, when mounted on the proximal end, from the proximal end and connecting the handle extension to the proximal end also distances the exerting from the generating.

When demolishing glazing comprising at least two subpanes, the subpanes can each have an instability, respectively thereamong from least to greatest. The method then comprises pushing out of the glazing the one subpane that has the greatest instability.

BRIEF DESCRIPTION OF THE DRAWINGS

FIG. 4A is a partial view that is the cross-sectional view, taken on line 4-4 in FIG. 2, of the pusher and the distal end of the handle up to the same break line that is shown in FIG. 4B;

and

Figure 2:
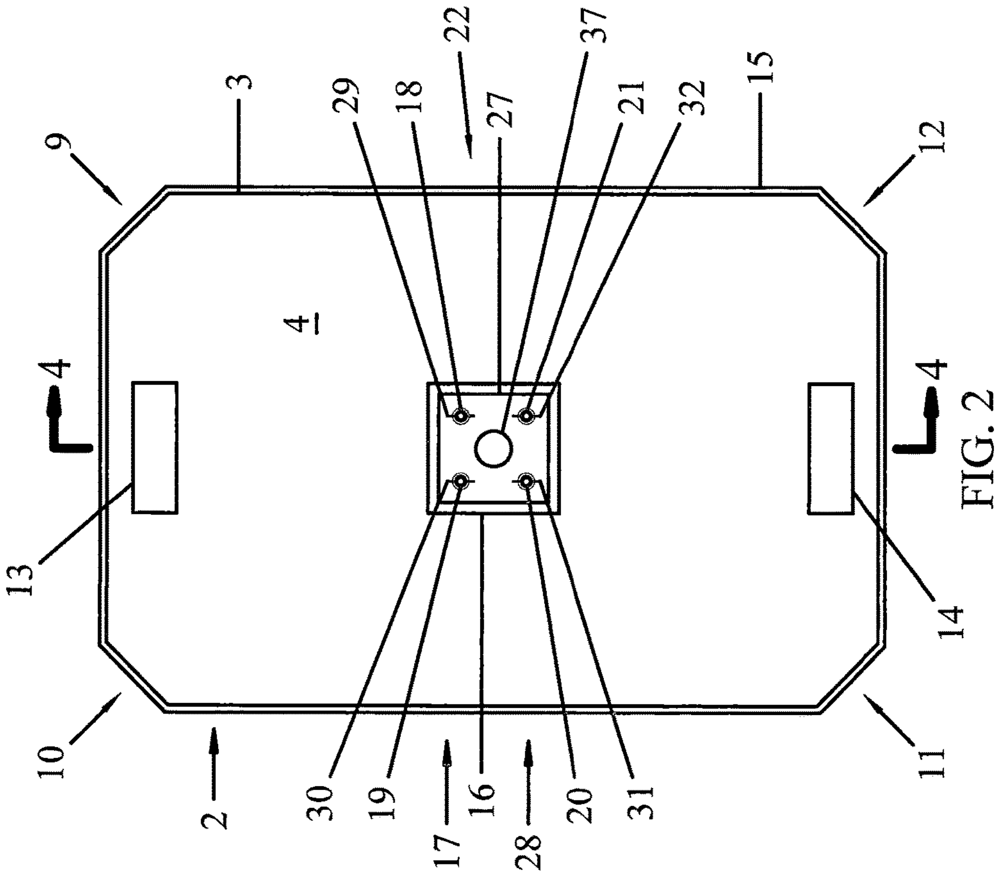
FIG. 2 is an end view of the embodiment of the present invention, as shown in FIG. 1, of the proximal end of the handle toward the proximal surface of the pusher.
Figures 4A, 4B:
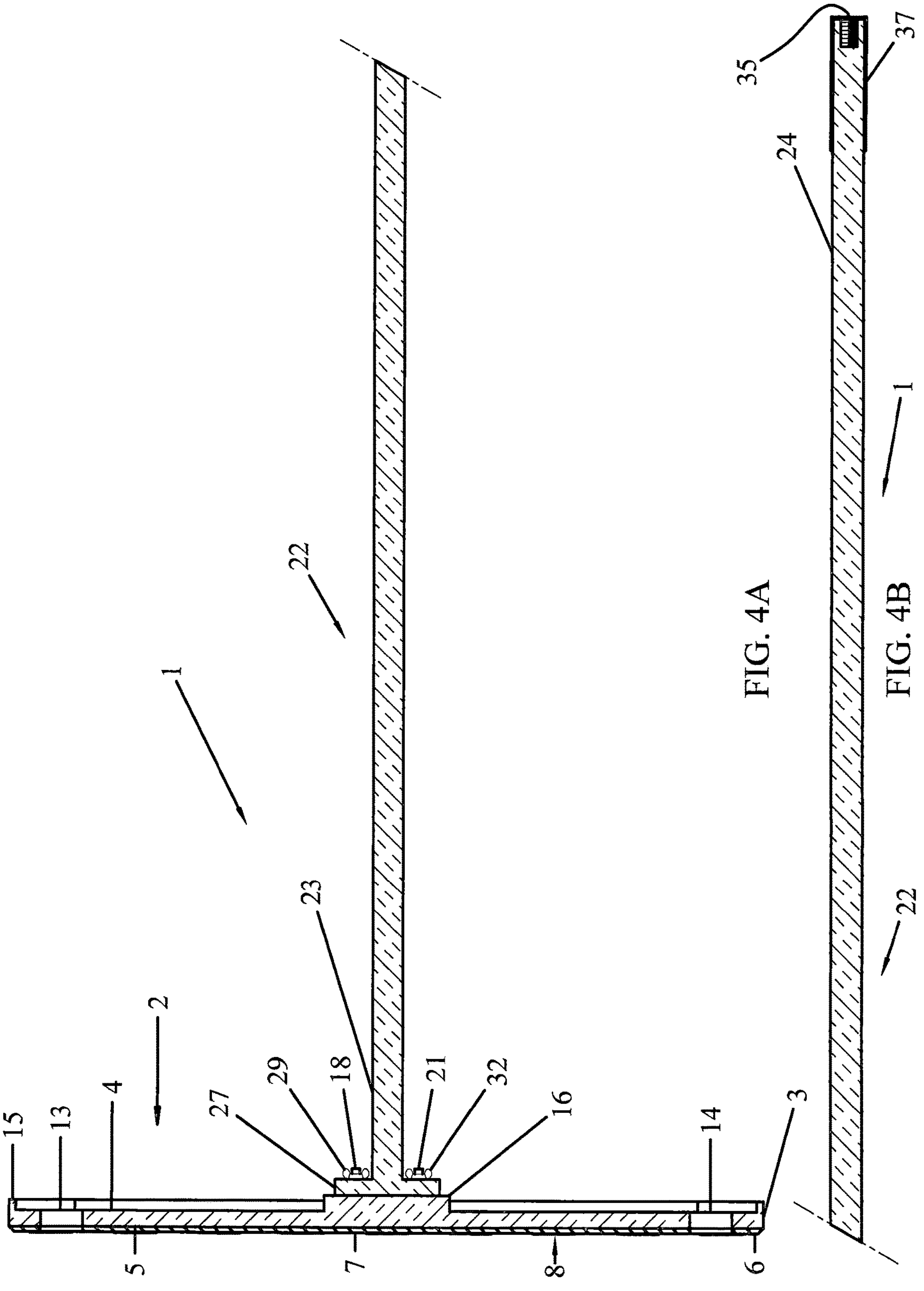
FIG. 4A and FIG. 4B together are a cross-sectional view taken on line 4-4 in FIG. 2, where.

FIG. 4B is a partial view that is the cross-sectional view, taken on line 4-4 in FIG. 2, of the proximal end of the handle up to the same break line that is shown in FIG. 4A.

Figure 1:
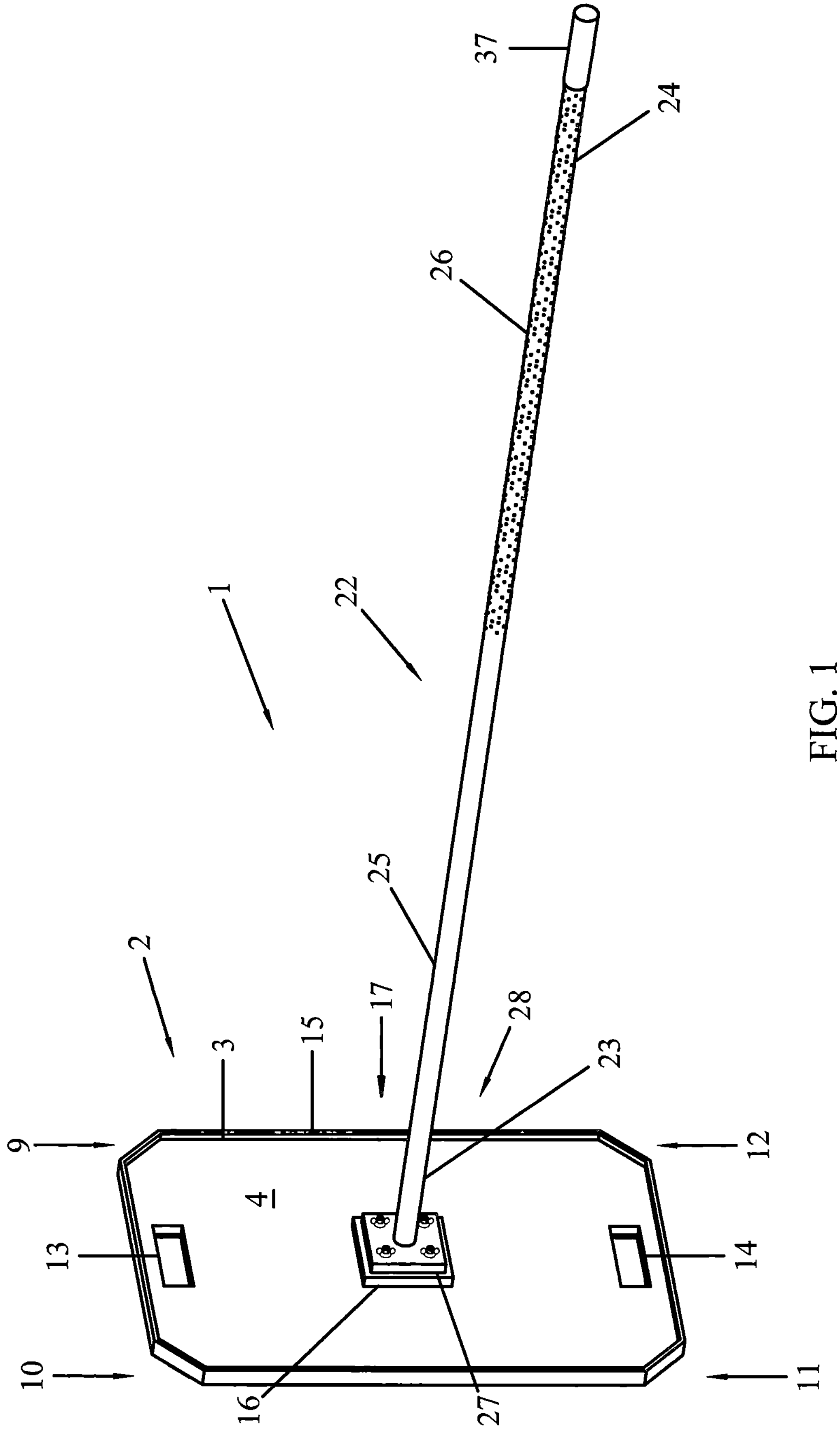
FIG. 1 is a perspective view of one embodiment of the present invention comprising a demolition ram comprising a pusher and a handle.
Figure 5:
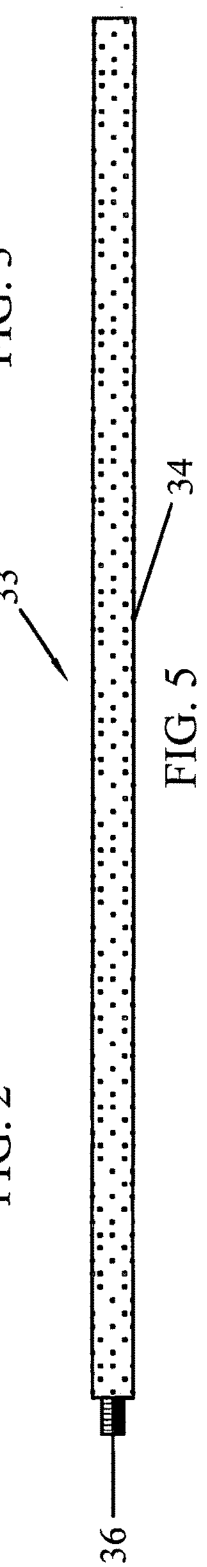

FIG. 5 is a side view, of the embodiment of the present invention as shown in FIG. 1 and FIGS. 4A and 4B, of a handle extension that is connectable to the handle.

Figure 6:
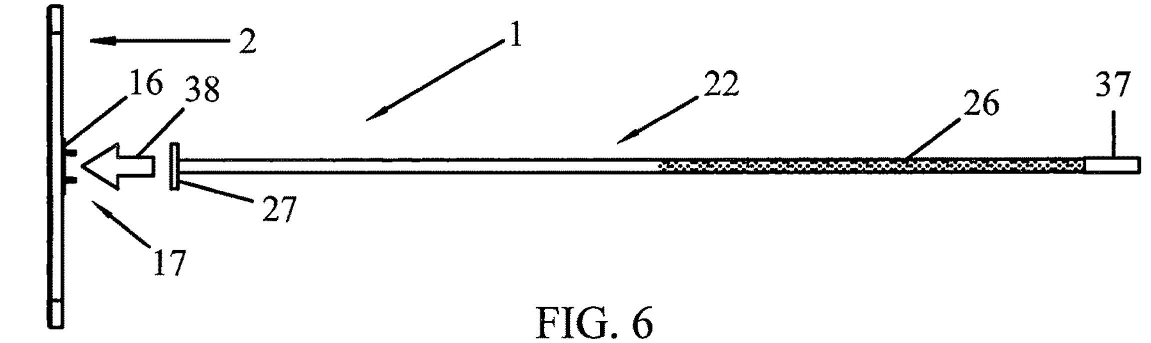

FIG. 6 is a side view of the embodiment of the present invention, as shown in FIG. 1, showing assembling of the pusher and the handle together.

Figure 7:
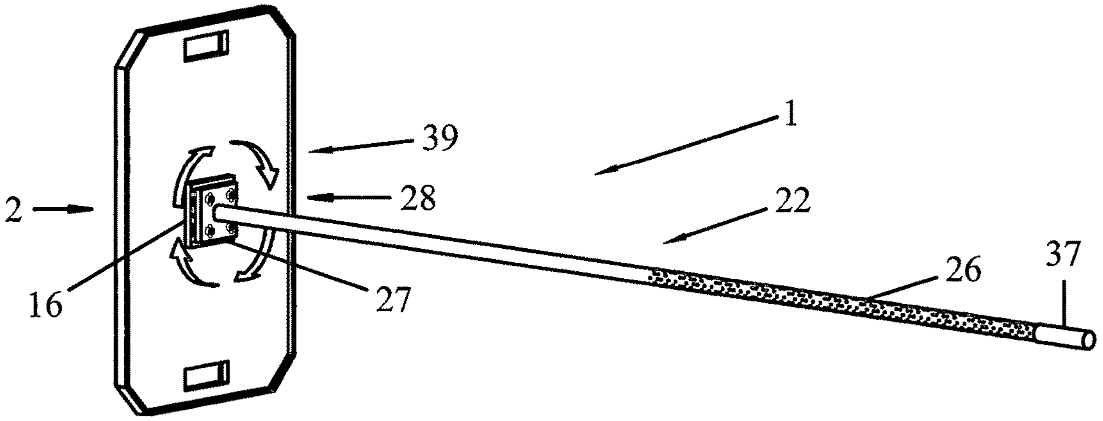

FIG. 7 is a perspective view of the embodiment of the present invention, as shown in FIG. 6, showing connecting of the pusher and the handle with fasteners.

Figure 8:
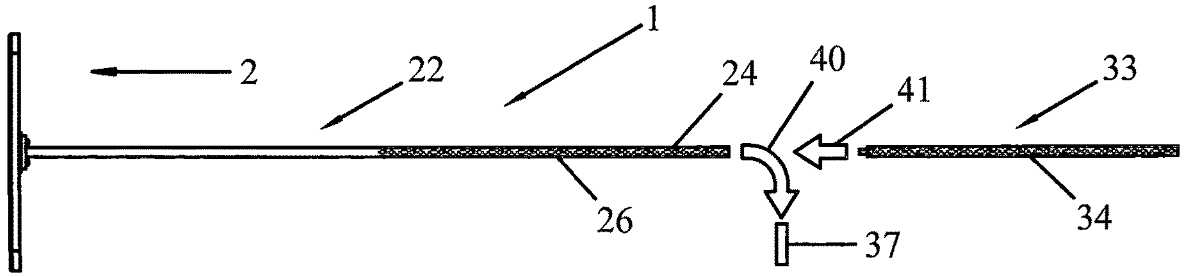

FIG. 8 is a side view of the embodiment of the present invention, as shown in FIG. 5 and FIG. 7, showing removing of an end cap, when mounted on the handle, from the handle before connecting of the handle extension to the handle.

Figure 9:
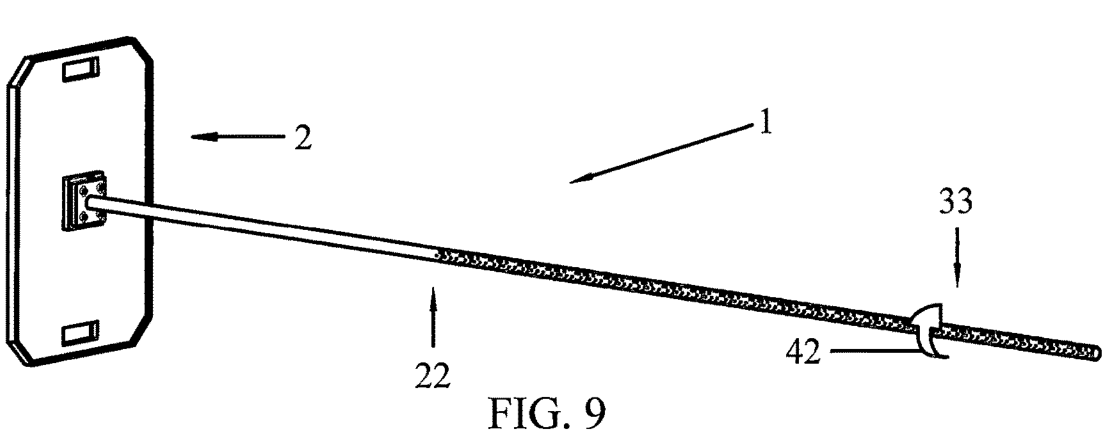

FIG. 9 is a perspective view of the embodiment of the present invention, as shown in FIG. 8, showing the connecting of the handle extension to the handle.

Figure 10:
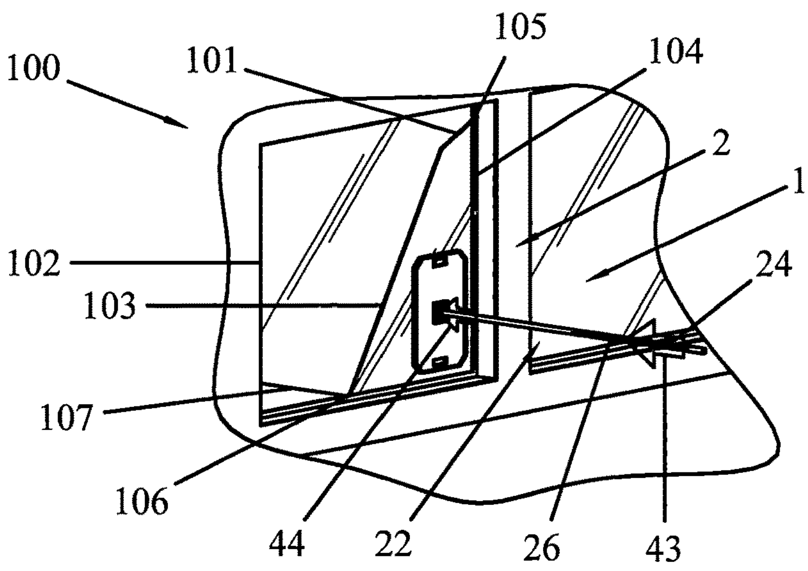

FIG. 10 is a view of one embodiment of the present invention that is an interior perspective view, partly broken, showing demolishing of glazing at a distance with a demolition ram, in accordance with one embodiment of the present invention as shown in FIG. 1, comprising touching a subpane of the glazing with the pusher of the demolition ram, and pushing the subpane out of the glazing with the demolition ram comprising exerting a force about the proximal end of the handle of the demolition ram and generating an impulsive force onto the subpane by the exerting through the touching, showing that the impulsive force is generally coaxial with the force of the exerting, and showing distancing the exerting from the generating.

Figure 11:
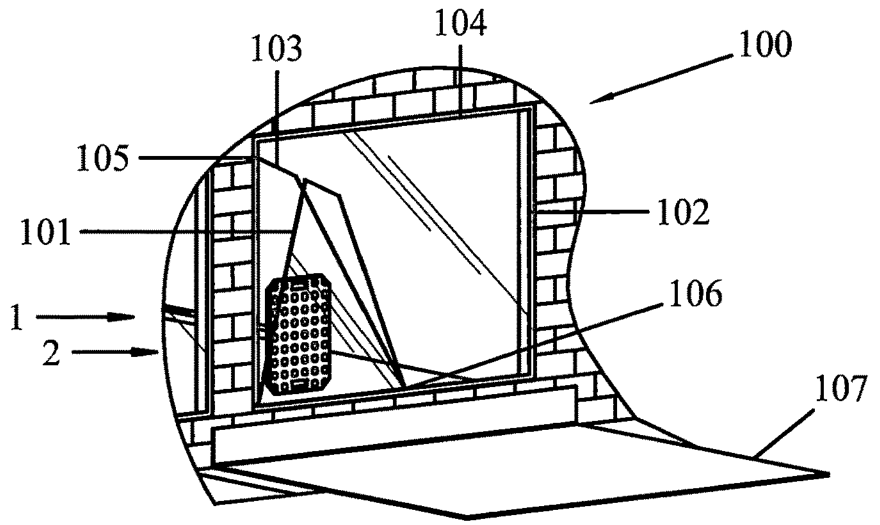

FIG. 11 is an exterior perspective view, partly broken, of the embodiment of the present invention, as shown in FIG. 1 and FIG. 10, showing moving the subpane to a position where the subpane can fall due to its weight, and allowing the subpane to fall due to its weight.

Figure 12:
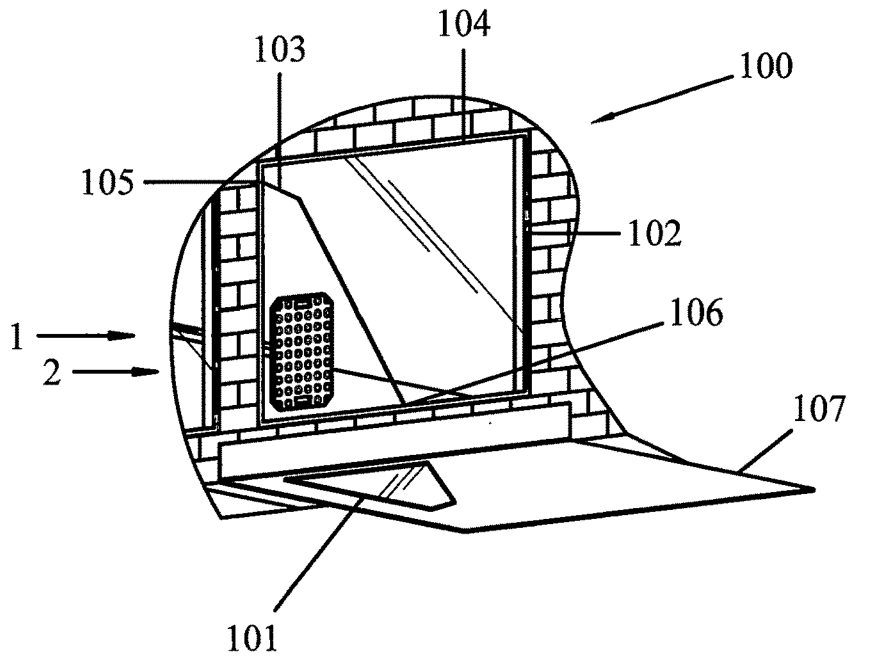

FIG. 12 is an exterior perspective view, partly broken, of the embodiment of the present invention, as shown in FIG. 1 and FIG. 11, showing catching the subpane as it falls with a receptacle comprising a mat.

DETAILED DESCRIPTION OF THE INVENTION

One embodiment of the present invention for demolishing glazing at a distance is a demolition ram 1, as shown in FIG. 1. The demolition ram 1 comprises a pusher 2. The pusher 2 is generally rectangular, having sides of equal length or preferably, as shown especially in FIG. 2 and FIG. 3, of unequal length.

Figure 3:
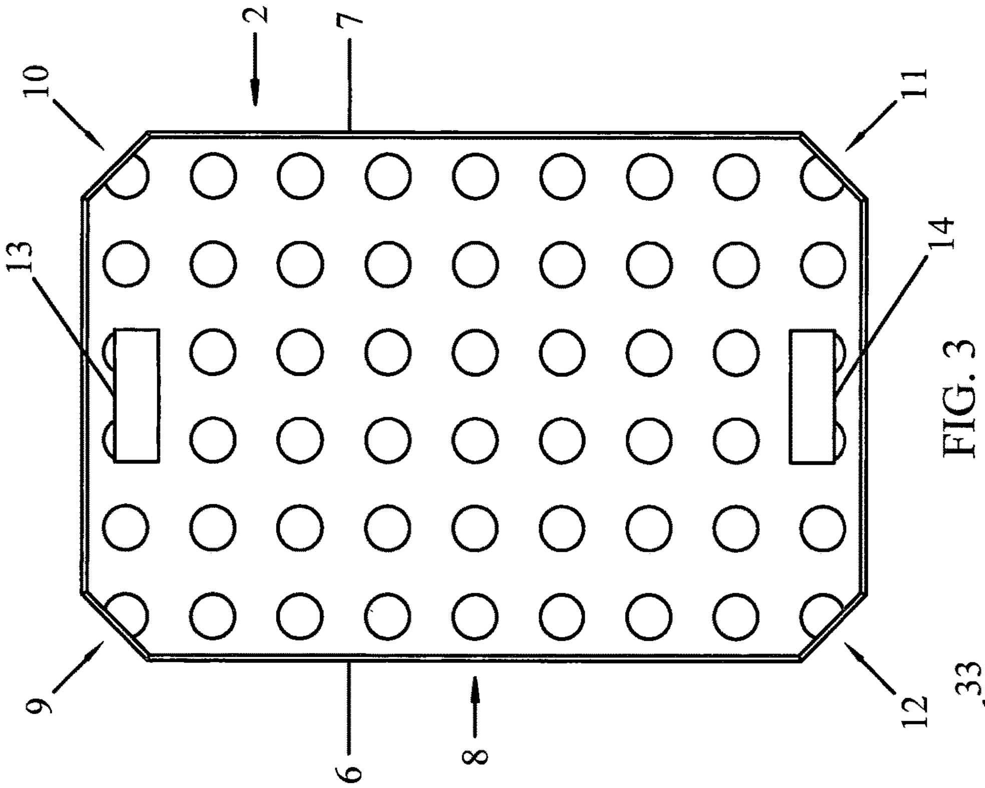
FIG. 3 is an end view of the embodiment of the present invention, as shown in FIG. 1, of the distal surface of the pusher.

The pusher 2 comprises a support plate 3. As shown in FIG. 1 and FIG. 2, and especially in FIG. 4A, the support plate 3 has a proximal surface 4, a distal surface 5, an outer edge defining the perimeter of the support plate 3, and a thickness. The thickness of the support plate 3 spaces the proximal surface 4 from the distal surface 5. The pusher 2 also comprises a nonslip plating 6 on the distal surface 5 as shown in FIG. 3 and FIG. 4A. The nonslip plating 6 preferably is a rubber coating that is glued, or otherwise adhered, to the distal surface 5. The rubber coating can, in fact, be a working plate 7, made of rubber, that is glued, adhered, or otherwise attached to the distal surface 5. The nonslip plating 6 has a raised pattern 8 on its outer surface. The raised pattern 8 preferably is an array of protrusions. The array may be orthogonally arranged as shown in FIG. 3, or (not shown) offset arranged. The protrusions may be generally equal as shown in FIG. 3 or unequal (not shown) to each other. One embodiment of the protrusions comprises circularly shaped pads as shown in FIG. 3.

Corners 9, 10, 11, and 12 of the pusher 2, and thus particularly of the support plate 3 and of the nonslip plating 6, are clipped to remove these right-angled corners, reducing the possibility of the demolition ram 1 undesirably catching on or damaging adjacent objects or injuring nearby persons. The pusher 2 is thus more particularly octagonal. The nonslip plating 6, too, is beveled defining the perimeter of the nonslip plating 6 as shown in FIG. 3 and FIG. 4A, also reducing the possibility of the demolition ram 1 undesirably catching on or damaging adjacent objects or injuring nearby persons. The nonslip plating 6 thus is a frustum having the larger base adhered to the distal surface 5 of the support plate 3 as shown in FIG. 4A. As shown in FIG. 3 and FIG. 4A, the larger base is equal in area to the distal surface 5. Thus, the perimeter of the nonslip plating 6 is not more than the perimeter of the support plate 3, and is generally within the perimeter of the support plate 3.

Handling apertures 13 and 14 go through the support plate 3 and the nonslip plating 6 of the pusher 2. The handling apertures 13 and 14 are located generally adjacent to but spaced from the shorter sides of the pusher 2. The handling apertures 13 and 14 are for easily handling the pusher 2, such as picking it up. While two handling apertures 13 and 14 are specifically shown in FIG. 1 through FIG. 4A, the present invention is contemplated to have any number of the handling apertures through the pusher 2, from at least one to as many as four or more adjacent to any of the sides of the pusher 2.

A reinforcing flange 15 is on the proximal surface 4 of the support plate 3 and extends generally perpendicularly away from the proximal surface 4. The reinforcing flange 15 is located at the perimeter of the support plate 3, is bounded by the perimeter by not exceeding beyond the perimeter, and encompasses the entire perimeter. Alternatively, a pattern (not shown) of reinforcing flanges can be arrayed across any portion, or the entirety, of the proximal surface 4.

A boss 16 is also on the proximal surface 4 of the support plate 3 of the pusher 2 within the perimeter of the support plate 3. The boss 16 has a perimeter less than the perimeter of the support plate 3, a proximal surface, and a thickness. As shown in FIG. 4A, the boss 16 is opposite of the distal surface 5, and the proximal surface of the boss 16 is parallel with the distal surface 5. The thickness of the support plate 3 spaces the boss 16 from the distal surface 5, and the thickness of the boss 16 spaces the proximal surface of the boss 16 from the proximal surface 4 of the support plate 3. Thus the boss 16 extends generally outwardly away from the proximal surface 4. The boss 16 is centrally located on the proximal surface 4, and is generally rectangular, having sides of unequal length or preferably, as shown especially in FIG. 1 and FIG. 2, of equal length. The reinforcing flange 15 and the boss 16 are spaced apart from each other. A first plurality of fasteners 17, as bolts 18, 19, 20, and 21 which preferably are nonshear hardened bolts and most preferably have shear strength A325 being, for example, grade 8 bolts or grade 5 bolts, are fixed on the boss 16. The fixed fasteners 17 preferably are partially embedded within the boss 16, with at least some of their distal portions being within the boss 16 and their proximal portions extending exteriorly outwardly from the boss 16 generally in the same direction as the direction of from the distal surface 5 to the proximal surface 4 of the support plate 3.

The demolition ram 1 also comprises a handle 22. The handle 22 is an elongate, generally circularly cross-sectional shaft, as shown in FIG. 1 and FIG. 2 and also in FIGS. 4A, 4B. While the handle 22, and also the handle extension 33, is specifically shown in FIG. 1 through FIG. 5 as circularly cross-sectional, the present invention is contemplated to encompass any cross-sectional geometry of either or both the handle 22 and the handle extension 33.

The handle 22 has a generally distal portion that has a distal end 23 of the handle 22 and a generally proximal portion that has a proximal end 24 of the handle 22. The handle 22 has a longitudinal axis generally concentric with the geometric cross section of the handle 22 and extending between the distal end 23 and the proximal end 24. The longitudinal axis is generally perpendicular to the proximal surface 4 of the support plate 3. The distal portion including the distal end 23 has a generally smooth surface 25, and the proximal portion including the proximal end 24 has a generally textured surface 26. The textured surface 26 is, generally, about half of the total surface, by either length or area, of the handle 22. Alternatively, the textured surface 26 may be more or less than half of the total surface, by either length or area, of the handle 22.

A plate 27 is at the distal end 23. The plate 27 is centrally located with respect to the cross section of the handle 22. The plate 27 is parallel with the boss 16 and parallel with the support plate 3. The geometry of the plate 27 generally corresponds with that of the boss 16, and thus preferably is also generally rectangular having sides of equal length but is slightly smaller in area than that of the boss 16 as shown in especially FIG. 2. A plurality of apertures matching the plurality of fixed fasteners 17 extend through the plate 27. The exteriorly extending proximal portions of the fixed fasteners 17 extend through the apertures in the plate 27 beyond the plate 27, in the same direction as the direction of from the distal surface 5 to the proximal surface 4 of the support plate 3. A second plurality of fasteners 28, removable, as nuts 29, 30, 31, and 32 which preferably are wing nuts that can be tightened by hand, are removably mountable on the fixed fasteners 17 for removably and rigidly connecting the plate 27 of the handle 22 to the boss 16 on the proximal surface 4 of the support plate 3 of the pusher 2 so that the plate 27 is on the proximal surface of the boss 16 as shown in FIG. 1 and FIG. 4A. The handle 22 thus connected to the proximal surface 4 of the support plate 3 of the pusher 2 is spaced from the perimeter of the support plate 3 as shown in FIG. 1 and centrally located on the proximal surface 4 as shown in FIG. 2.

A handle extension 33 for the demolition ram 1 is an elongate shaft, preferably generally circularly cross-sectional, as shown in FIG. 5. Preferably, the handle extension 33 matches the proximal end 24 of the handle 22. The surface of the handle extension 33, and preferably the entire circumferential surface as shown in FIG. 5, is a generally textured surface 34.

As shown in FIG. 4B, the proximal end 24 has a socket 35, as a fastener, that is threaded. A pin 36, as a fastener, is on a terminus of the handle extension 33, and is also threaded. The handle extension 33 is connectable to the proximal end 24 of the handle 22 by the socket 35 and the pin 36 being threadably connectable together.

An end cap 37 is removably mountable on the proximal end 24. The end cap 37 may be rubber or plastic. The end cap 37 is friction-fitted onto the proximal end 24, and covers the socket 35 when the handle extension 33 is not on, and not connected to the proximal end 24 of, the handle 22.

The pusher 2 and the handle 22 of the demolition ram 1, as well as the handle extension 33, may be made of any suitable material. Preferably, each of the pusher 2, the handle 22, and the handle extension 33 is made of solid fiberglass. The lineal density of the fiberglass may be about 2.2 pounds per 32 inches (about 1 kilogram per 0.8 meters). The support plate 3, the reinforcing flange 15, and the boss 16 may be unitarily formed as a single piece of fiberglass. The nonslip plating 6 is therefore adhered, or otherwise attached, to this single fiberglass piece. Likewise, the handle 22 and the plate 27 at the distal end 23 may be unitarily formed as a single piece of fiberglass. The handle extension 33, with the pin 36, may also be unitarily formed as a single fiberglass piece. The textured surface 26 of the proximal end portion of the handle 22 may be unitarily formed of the material of the handle 22. Also, the textured surface 34 of the handle extension 33 may be unitarily formed of the material of the handle extension 33. Alternatively, the pusher 2, specifically the support plate 3, could be steel and the handle 22, and also the handle extension 33, could be aluminum. Moreover, instead, the pusher 2 could be a four-foot-by-eight-foot sheet (122 by 244 centimeters) of OSB (commonly known as chipboard) or plywood, and the handle 22 could be a ten-foot length (0.3 meters) of two-by-four (5 by 10 centimeters) studding lumber.

The pusher 2, the handle 22, and the handle extension 33 of the demolition ram 1 are sized for more safely demolishing glazing at a distance. Typically, one size, a common residential glazing size, for the demolition ram 1 is for common sizes of the glazing of residential windows such as 20 by 24 inches (51 by 61 centimeters); and a different size, a large-scale glazing size, for the demolition ram 1 is for large-scale glazing as may be exemplified by plate glass such as 84 by 108 inches (213 by 274 centimeters). The common residential glazing size would typically be on the order of about 16 by 16 inches (about 40 by 40 centimeters) or about 18 by 18 inches (about 46 by 46 centimeters) for the pusher 2. The large-scale glazing size would typically be on the order of about 24 by 36 inches (about 61 by 91 centimeters), although it could be anywhere from about 22 by 30 inches (about 56 to 76 centimeters) to about 48 by 48 inches (about 122 by 122 centimeters). For both the common residential glazing size and the large-scale glazing size, typically the support plate 3 would have a thickness on the order of about three fourths of an inch (about 19 millimeters), the boss 16 also having a thickness on the order of about three fourths of an inch (about 19 millimeters) and a size on the order of about six by six inches (about 15 by 15 centimeters), and the plate 27 also having a thickness on the order of about three fourths of an inch (about 19 millimeters) but a size on the order of about five by five inches (about 13 by 13 centimeters). The reinforcing flange 15 typically would have a thickness on the order of about five sixteenths of an inch (about 8 millimeters) and a height of about one half of an inch (about 13 millimeters).

The handle 22 is sized to space distantly far apart a worker using the demolition ram 1 to demolish glazing and the glazing itself; and preferably also sized so as to fit, either along the length or else diagonally, within a conventional pickup truck bed. Further, the handle 22, and also the handle extension 33, is sized so as to be easily grasped by hand and especially when those handling the demolition ram 1 are wearing gloves. The handle 22 for the common residential glazing size typically would be on the order of about nine feet (about 274 centimeters) in length by about four and one-half inches (about eleven and one-half centimeters) in circumference. The handle 22 for the large-scale glazing size would typically be on the order of about nine feet to ten feet (about 274 to 305 centimeters) by about four and one-half inches (about eleven and one-half centimeters) in circumference. The handle extension 33 would more likely be used for the large-scale glazing size, and would typically be on the order of about four feet to three feet (about 122 to 91 centimeters) in length by about four and one-half inches (about eleven and one-half centimeters) in circumference; thus, the connected-together handle 22 and handle extension 33 would be about thirteen feet (about 396 centimeters) in length. The end cap 37 for the proximal end 24 of the handle 22 typically would have a length on the order of about six inches (about 15 centimeters).

Thus, in sizing the handle 22 and the handle extension 33 to space distantly far apart a worker using the demolition ram 1 to demolish glazing and the glazing itself, the handle 22 has a slenderness ratio defined as the ratio of the overall length of the handle 22 to the maximum transverse dimension, as a diameter when the cross section of the handle 22 is circular as shown, of the handle 22. Specifically, the overall length of the handle 22 is the length of the handle 22 between the terminus, where the plate 27 is, of the distal end 23 and the terminus, where the opening for the socket 35 is, of the proximal end 24. Preferably, the slenderness ratio of the handle 22 is about seventy-five; but the slenderness ratio of the handle 22 may be in the range of at least twenty-five and not more than one hundred ten. Further, the connected-together handle 22 and handle extension 33 as a unit preferably has a slenderness ratio of about one hundred eight, but may have a slenderness ratio of at least one hundred five and not more than one hundred fifteen.

The demolishing of the glazing at a distance begins first with an evaluation of the glazing. The glazing may comprise exactly one original pane, or may comprise a plurality of original panes, irrespective of the assembly or structure of the glazing, for example singular framing or multiple framing, whether external or internal, and also irrespective of the number of any layering of panes between the ultimately inner surface and the ultimately outer surface of that pane, whether that pane is exactly one original pane or one of a plurality of original panes, although such inner and outer with respect to such surfaces may not necessarily be with respect to any inside and outside.

The glazing may be essentially completely undamaged, and the glazing is to be demolished for reasons other than damage to that glazing such as replacement, by, for example, new glazing, or to have the opening for it in the wall for it to be closed up or sealed off.

Alternatively, the glazing to be demolished may be damaged, but any apparent damage, as a crack or a hole, in the material, for example glass, in the glazing does not fully divide any original pane into individual subpanes. Specifically, every original pane has its own perimeter edge, that may comprise any number of rectilinear or curved edges including exactly one edge, that define the perimeter of its pane and encompass the volume and the opposite surfaces, that are the ultimately inner surface and the ultimately outer surface, of that pane; and, furthermore, due to the necessarily three dimensionality of that pane, its perimeter edge might even be identified as an extensive surface, but is nonetheless the perimeter edge of that pane because it does encompass the volume and the opposite surfaces of that pane. Thus, damage, for example a crack, may not fully divide any original pane into individual subpanes by extending from one point on the perimeter edge of that pane to a different point on the perimeter edge, irrespective of the number of any layering of panes between the ultimately inner surface and the ultimately outer surface of that pane.

In either case, any such original pane of that glazing is its own subpane; in other words, the subpane is one hundred percent of the original pane of that glazing to be demolished, irrespective of the total number of original panes of that glazing.

However, it is more frequently the case that the demolition is the demolishing of glazing that comprises, not merely at least one subpane due to the original pane being its own subpane, but at least two subpanes due to at least one of the original panes of that glazing having at least one crack that extends from one point on the perimeter edge of that original pane to a different point on the perimeter edge of that original pane.

Furthermore, though, if there is at least one such crack that has fully divided any original pane into individual subpanes, it may be that one or more of those subpanes have already fallen or are otherwise removed from the glazing. In which case, there may be indeed at least one subpane, and perhaps only one subpane remaining, in the glazing that is less than one hundred percent of the original pane of that glazing to be demolished.

Continuing the demolition, a receptacle is located to easily and safely catch the glazing as it is being demolished. Many times, though, a common waste gondola is too tall to locate immediately in front of and below the glazing for especially large-scale glazing. Therefore, the present invention contemplates a mat for the receptacle, such as an industrial quilt or a fire blanket for example, especially in such a case.

FIGS. 10, 11, and 12 show the demolishing at a distance of glazing 100 that has at least one subpane, and specifically two subpanes 101 and 102 due to a crack 103 in the original pane of the glazing 100 dividing the original pane into the two subpanes 101 and 102 by extending between one point 105 on the perimeter edge 104 of the original pane to a different point 106 on the perimeter edge 104. The demolishing of the glazing 100 includes removing the subpanes 101 and 102 from the glazing 100. Preferably, the direction of removal is toward the exterior of the glazing 100, although removal toward the interior may also be done. Preliminary to the removing of the subpanes 101 and 102, any supporting trim, mould, seal, or caulk may be removed. As the demolishing shown in FIGS. 10, 11, and 12 is toward the exterior of the glazing 100, this would be done on only the ultimately outer surface of the original pane, and on only the next subpane to be removed.

A mat 107, as a receptacle, is placed to catch the subpanes, and in the embodiment as shown in FIGS. 10, 11, and 12, the subpanes 101 and 102, as they are removed from the glazing 100.

Next, the instability of each subpane is evaluated. The factors of instability include how loose that subpane is, how it responds to a light touch toward inclining it slightly out of the glazing, whether the framing is lessened in maintaining that subpane in the glazing, etc. Thus, the instability of each subpane is identified, and the subpanes have amongst themselves a range of instability, respectively from the least to the greatest. Therefore, one of the subpanes has the greatest instability. However, sometimes the instabilities are approximately equal; and may even be a null result, that is, approximately zero instability. Then in this case the subpane with the greatest instability is that subpane the removal of which would affect the other subpanes the least.

Further, the pusher 2 of the demolition ram 1 is selected for its size, either the residential glazing size or the large-scale glazing size. This is typically based upon the specific subpane to be removed. Therefore, at times the residential glazing size may be selected for the demolition of large-scale glazing, or the large-scale glazing size may be selected for the demolition of residential glazing, so as to better match the specific subpane that is next to be removed.

Then the handle 22 is selected for its size to distance far apart a worker using the demolition ram 1 from the glazing being demolished by the slenderness ratio of the handle 22, and in the embodiment as shown in FIGS. 10, 11, and 12, the glazing 100. More typically, the residential glazing size is almost always selected for demolishing common residential glazing, and the large-scale glazing size is almost always selected for demolishing large-scale glazing, although it may be vice versa as need be for the specific demolition.

Also, the pusher 2 or the handle 22, or both, of the demolition ram 1 for the size selected may be disassembled from the demolition ram 1 and a different size of the pusher 2 or the handle 22, or both, selected for reassembly of the demolition ram 1, or also connecting or disconnecting of the handle extension 33 to or from the handle 22, during the same demolition of the same glazing, so as to better match the specific subpane that is next to be removed when distancing far apart the worker using the reassembled demolition ram 1 from the specific subpane of the glazing being next demolished.

Upon selecting the pusher 2 and the handle 22, the demolition ram 1 is assembled by aligning the apertures in the plate 27 with the fixed fasteners 17 on the boss 16. Assembling the handle 22 and the pusher 2 together is shown in FIG. 6, and is by moving 38 the handle 22 toward the pusher 2 until the plate 27 is adjacent to the boss 16. The removable fasteners 28 are then removably mounted onto the fixed fasteners 17, as by rotating 39 them as shown in FIG. 7, removably and rigidly connecting the plate 27 of the handle 22 to the boss 16 of the pusher 2.

Optionally, and especially for the demolition of large-scale glazing, the handle extension 33 may be connected as shown in FIG. 8 to the handle 22 for greater distancing of those demolishing the glazing. The end cap 37 that is mounted on the proximal end 24 of the handle 22 is removed 40 from the handle 22. Then, the handle extension 33 is moved 41 toward the proximal end 24 of the handle 22. The pin 36 is inserted into the socket 35 for threadably connecting to each other, rotatably connecting 42 the handle extension 33 to the handle 22 as shown in FIG. 9.

In so assembling of the handle 22 and the pusher 2 together, and also the removing of the end cap 37 from the proximal end 24 and the connecting of the handle extension 33 to the proximal end 24 of the handle 22 when the handle extension 33 is connected to the handle 22, that are selected for their sizes and particularly the slenderness ratio of the handle 22, or of the connected-together handle 22 and handle extension 33 as a unit, the worker using the demolition ram 1 when demolishing the glazing, and in the embodiment as shown in FIGS. 10, 11, and 12 the glazing 100, will be distantly far apart from that glazing.

Upon assembly of the demolition ram 1 and deployment, and for the embodiment of the present invention as shown in FIG. 10 within the interior with respect to the glazing 100, of the demolition ram 1, the demolishing commences. In the embodiment of the present invention as shown in FIG. 10, the subpane 101 has been identified as having the greatest instability, and thus is first to be removed from the glazing 100 by pushing the subpane 101 out of the glazing 100 with the demolition ram 1. The worker or workers demolishing the glazing 100 at a distance manipulate by hand the demolition ram 1 by handling the handle 22. Specifically, the textured surface 26 of the proximal end portion of the handle 22, and also the textured surface 34 of the handle extension 33 if the handle extension 33 is connected to the handle 22, provides a nonslip grip for firmly manipulating the handle 22 by hand. By manipulating the demolition ram 1 at the proximal end 24 or the handle extension 33, the worker or workers are spaced distantly far from the glazing, reducing the risk of serious or fatal injury during the demolition of the glazing 100.

As shown in FIG. 10, the demolition ram 1 is moved by the worker or workers so that the nonslip plating 6 of the pusher 2 is touching the subpane 101 at the ultimately inner surface of the subpane 101. The pushing of the subpane 101 out of the glazing 100 is by exerting 43 a force about the proximal end 24 of the handle 22, and also the handle extension 33 if the handle extension 33 is connected to the handle 22. The exerting 43 of that force generates an impulsive force 44 onto the subpane 101 through the touching of the subpane 101 with the nonslip plating 6 of the pusher 2. The impulsive force 44 is generally coaxial with the exerting 43 of the force about the proximal end 24 in that both the impulsive force 44 and the force of the exerting 43 about the proximal end 24 are generally aligned with and centered about the longitudinal axis of the handle 22. As shown in FIG. 10, the slenderness ratio of the handle 22, or the slenderness ratio of the connected-together handle 22 and handle extension 33 as a unit if the handle extension 33 is connected to the handle 22, distances the exerting 43 of the force about the proximal end 24 of the handle 22, and also the handle extension 33 if the handle extension 33 is connected to the handle 22, from the generating of the impulsive force 44 onto the subpane 101 of the glazing 100 being demolished. The impulsive force 44 is moderate, on the order of about 40 pounds (about 180 newtons of force), resulting in moving the subpane 101 to a position where the subpane 101 can fall due to its own weight.

Once moved to that position, as shown in FIG. 11, the subpane 101 continues to move both due to the inertia from the pushing and also due to the force of gravity. Allowing the subpane 101 to fall due to its weight, the subpane 101 collapses downward. FIG. 12 shows catching the falling subpane 101 with the mat 107. The subpane 101 is less likely to break upon impact with the mat 107; but even if the falling subpane 101 upon catching with the mat 107 does break, the newly broken subpanes of the subpane 101 are more likely to still be retained by the mat 107.

Once caught in the mat 107, the subpane 101 is broken up on the mat 107. The mat 107, with all of the fragments of the subpane 101, is then emptied (not shown), and preferably into a waste gondola, for safe disposal. Alternatively, another subpane or piece of the glazing can also be demolished by pushing it out of the glazing so that it can fall and be caught by the mat 107 before emptying the mat 107. The mat 107 is then replaced to continue to catch more of the glazing 100 that is being demolished.

Subsequently, each next subpane, and in the embodiment as shown in FIGS. 10, 11, and 12, the subpane 102, sequentially is also likewise removed from the glazing 100 by pushing that next subpane out of the glazing 100 with the demolition ram 1 until all or substantially all of the subpanes have been removed from the glazing. Nonetheless, any small fragments remaining in the glazing, for example still within any framing at the perimeter edge of the original pane, may be more easily and still safely removed conventionally.

After the mat 107 is no longer needed for the demolition of the glazing, the mat 107 can be put away for cleaning and storage for later reuse. The demolition ram 1 can also be disassembled for storage for later reuse.

Thus, the demolition ram 1 and the demolishing of glazing at a distance with the demolition ram 1 of the present invention can quickly demolish glazing yet reduce the risk of serious or fatal injury during that demolition of the glazing.

I claim:

1. A method of demolishing glazing at a distance with a demolition ram wherein the glazing comprises at least one subpane having a weight:

wherein the demolition ram comprises:
- a pusher comprising a plate having a proximal surface, a distal surface, and a perimeter,
- a handle having a proximal end, a distal end, and a longitudinal axis extending between the ends, and
- fasteners, comprising a first plurality, that connect the handle to the pusher;

wherein the first plurality is on the pusher;

wherein:
- the handle is rigidly connected at the distal end to the plate on the proximal surface spaced from the perimeter,
- the longitudinal axis is generally perpendicular to the proximal surface, and
- the handle is centrally located on the proximal surface;

wherein said method comprises:
- touching the subpane with the pusher;
- pushing the subpane out of the glazing with the demolition ram, wherein said pushing comprises:
  - exerting a force about the proximal end, and
  - generating an impulsive force onto the subpane by said exerting through said touching; and
- moving the subpane by said impulsive force to a position where the subpane can fall due to the weight thereof;

wherein said impulsive force is generally coaxial with said force of said exerting;

wherein said method further comprises a step for distancing said exerting from said generating; and wherein said step for distancing comprises the handle having a slenderness ratio of at least twenty-five and not more than one hundred ten.

2. The method of claim 1, further comprising:

allowing the subpane to fall due to the weight thereof; and catching the subpane, as the subpane falls, with a receptacle.

3. The method of claim 1, further comprising:

allowing the subpane to fall due to the weight thereof; and catching the subpane, as the subpane falls, with a receptacle comprising a mat.

4. The method of claim 1, wherein the pusher further comprises a plating on the distal surface; and wherein said touching comprises touching the subpane with the plating.

5. The method of claim 1, wherein said step for distancing further comprises assembling the pusher and the handle together; and wherein said assembling comprises removably and rigidly connecting the handle to the pusher with the fasteners.

6. The method of claim 5, wherein the demolition ram further comprises a handle extension; and wherein said step for distancing further comprises connecting the handle extension to the proximal end.

7. The method of claim 6, wherein the demolition ram further comprises an end cap removably mountable on the proximal end; and wherein said step for distancing further comprises removing the end cap, when mounted on the proximal end, from the proximal end before said connecting the handle extension to the proximal end.

8. The method of claim 5, wherein the handle comprises a plate at the distal end;

wherein the pusher further comprises a boss on the proximal surface; and wherein said connecting comprises connecting the plate of the handle to the boss with the fasteners.

9. The method of claim 5, wherein the handle comprises a plate at the distal end;

wherein the pusher further comprises a boss on the proximal surface;

wherein the fasteners further comprise a second plurality;

wherein the first plurality comprises fixed fasteners on the boss;

wherein the second plurality comprises removable fasteners; and wherein said connecting comprises removably connecting the plate of the handle to the boss comprising removably mounting the removable fasteners on the fixed fasteners.

10. The method of claim 1, wherein:

the glazing comprises at least two of the subpanes, the subpanes each has an instability, respectively thereamong from least to greatest, and one of the subpanes has the greatest instability; and wherein said pushing comprises:

pushing the one subpane, that has the greatest instability, out of the glazing with the demolition ram.

* * * * *